(12) United States Patent
Yoshida

(10) Patent No.: US 6,888,570 B1
(45) Date of Patent: May 3, 2005

(54) IMAGE PICKUP DEVICE AND EXPOSURE CONTROL METHOD IN THE IMAGE PICKUP DEVICE

(75) Inventor: Hideaki Yoshida, Hachioji (JP)

(73) Assignee: Olympus Corporation, Tokyo (JP)

( * ) Notice: Subject to any disclaimer, the term of this patent is extended or adjusted under 35 U.S.C. 154(b) by 885 days.

(21) Appl. No.: 09/713,973

(22) Filed: Nov. 16, 2000

(30) Foreign Application Priority Data

Nov. 17, 1999 (JP) ............................................. 11-327211

(51) Int. Cl.$^7$ ................................................. H04N 3/14
(52) U.S. Cl. ...................... 348/296; 348/298; 348/312; 348/248; 348/249; 348/362
(58) Field of Search ................................. 348/296, 297, 348/298, 312, 248, 249, 362, 363, 364, 311, 367, 368, 224.1, 222.1, 299, 213

(56) References Cited

U.S. PATENT DOCUMENTS

| | | | | |
|---|---|---|---|---|
| 4,599,657 A | * | 7/1986 | Kaji et al. ................... | 386/117 |
| 4,689,686 A | * | 8/1987 | Hashimoto et al. ...... | 348/230.1 |
| 4,763,204 A | * | 8/1988 | Kinoshita et al. .......... | 386/120 |
| 5,517,243 A | * | 5/1996 | Kudo et al. ................. | 348/296 |
| 5,760,727 A | * | 6/1998 | Lin ............................ | 341/155 |
| 5,767,904 A | * | 6/1998 | Miyake ...................... | 348/362 |
| 6,292,220 B1 | * | 9/2001 | Ogawa et al. .............. | 348/312 |
| 6,498,623 B1 | * | 12/2002 | Anderson et al. ........... | 348/312 |
| 6,614,477 B1 | * | 9/2003 | Lee et al. ................... | 348/312 |
| 6,618,090 B1 | * | 9/2003 | Kidono et al. .............. | 348/362 |
| 6,628,328 B1 | * | 9/2003 | Yokouchi et al. ........ | 348/221.1 |
| 6,667,770 B1 | * | 12/2003 | Higuchi et al. ............. | 348/362 |
| 6,700,610 B1 | * | 3/2004 | Kijima et al. ............... | 348/296 |

FOREIGN PATENT DOCUMENTS

| | | |
|---|---|---|
| JP | 01-117577 | 5/1989 |
| JP | 03-167534 | 7/1991 |
| JP | 04-142884 | 5/1992 |
| JP | 10-191170 | 7/1998 |

* cited by examiner

Primary Examiner—Wendy R. Garber
Assistant Examiner—Chriss S. Yoder
(74) Attorney, Agent, or Firm—Straub & Pokotylo; John C. Pokotylo (57) ABSTRACT

An image pickup device comprises a CCD solid-state imaging element composed of a charge accumulation section and a charge transfer section, a CCD driver for driving the imaging element, a mechanical shutter for switching between the transmitting state and shading state of the subject's image on the imaging element, and a controller for controlling the CCD driver and mechanical shutter. The controller, closes, opens and closes the mechanical shutter in that order. After having discharged charges in the first closing, the device refrains from driving the vertical transfer channel during the period that the channel is exposed to light rays and ends exposure in the presence of a charge transfer pulse. Moreover, in a low-speed shutter, the image pickup device switches to exposure end with the mechanical shutter.

24 Claims, 3 Drawing Sheets

(Prior Art)

IMAGE PICKUP DEVICE AND EXPOSURE CONTROL METHOD IN THE IMAGE PICKUP DEVICE

CROSS-REFERENCE TO RELATED APPLICATIONS

This application is based upon and claims the benefit of priority from the prior Japanese Patent Application No. 11-327211, filed Nov. 17, 1999, the entire contents of which are incorporated herein by reference.

BACKGROUND OF THE INVENTION

This invention relates to an image pickup device using a solid-state imaging element, such as a CCD, that converts the picked-up optical image into an electric signal and an exposure control method in the image pickup device, and more particularly to an image pickup device capable of alleviating smears and an exposure control method in the image pickup device.

In recent years, electronic image pickup devices for converting the picked-up optical image into an electric signal have been widely used. Of such electronic image pickup devices, digital cameras for picking up still pictures are beginning to have the performance comparable to silver-bromide analog cameras. In this specification, unless otherwise specified, explanation will be given on the assumption that an electronic image pickup device is an electronic still camera with a digital circuit system, or a digital camera. The techniques of the present invention can be applied to analog electronic image pickup devices, or analog electronic still cameras. In the explanation, however, a case where the present invention is applied to a digital camera will be explained, taking the digital camera as a typical electronic image pickup device.

The still picture camera has been required to have a wide variety of functions. Of the functions, exposure control in photography has been especially given importance. The still picture camera has realized the various exposure functions achieved by the silver-bromide camera and further accomplished functions the silver-bromide camera cannot realize.

One of the functions the silver-bromide camera cannot realize is an electronic shutter realized by controlling the accumulation of charges in a CCD image pickup element. The electronic shutter can realize a high-speed shutter function the mechanical shutter of an ordinary silver-bromide camera cannot realize. To make effective use of the function, a progressive scanning (sequential scanning) CCD image pickup element has been incorporated into a digital camera. On the other hand, there are various disadvantages stemming from the image pickup element, including the factor degrading the picture quality. To prevent the disadvantages from becoming tangible, various improvements have been made in the digital camera for practical use.

A typical one of the disadvantages is what is called a smear phenomenon that occurs when intense light rays strike the CCD image pickup element. Although the smear phenomenon is a phenomenon including not only smears but also deterioration of picture quality caused by smears and blooming, the phenomenon is called just a smear in this specification according to usage among those skilled in the art. Specifically, the phenomenon takes place when charges not trapped in the original charge accumulation region climb over the potential barrier and leak into the vertical transfer channel and some diffraction components or multiple reflection components of the incident rays leak into the vertical transfer channel under the shade film. When ordinary steady light rays cause a smear phenomenon, the phenomenon lasts throughout a vertical transfer period. Thus, in the case of light rays considered to cause the phenomenon, for example a spotlight, vertical stripes extending upward and downward appear on the picked-up image, which impairs the picture quality seriously. Several methods of alleviating the smear phenomenon have been proposed, including a method of correcting the image signal and a method of using an optical shutter. The method of correcting the image signal, however, gives no basic solution to the problem of the smear phenomenon, because it corrects the image signal after having obtained the electronic image signal.

Figure 1A:
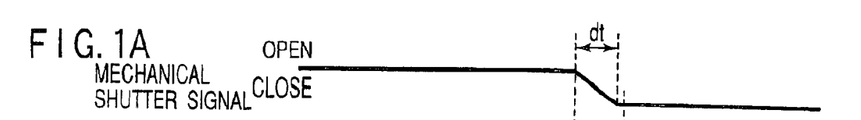
FIGS. 1A to 1D are timing charts showing the timing of each signal in exposure control in a conventional image pickup device.
Figure 1B:
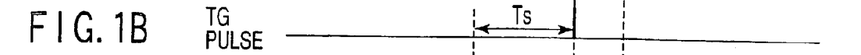
Figure 1C:
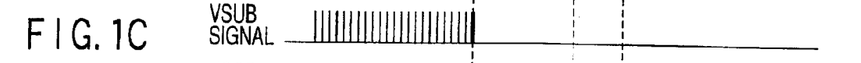
Figure 1D:
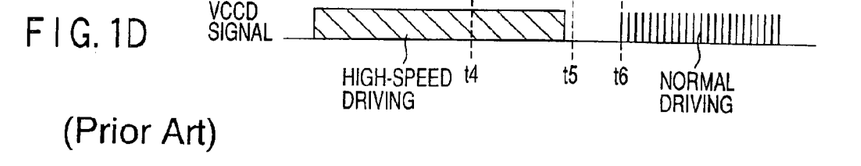

In contrast, one known method of using an optical shutter employs a driving method as shown in FIGS. 1A to 1D. FIGS. 1A to 1D show an example of timing charts for driving a CCD image pickup element with a sequential scanning overflow drain structure: FIG. 1A shows the opening and closing of a mechanical shutter; FIG. 1B shows a transfer gate pulse for transferring a charge signal from a charge accumulation region to a vertical transfer channel, or a TG (transfer gate) signal; FIG. 1C shows a high-voltage pulse applied to the substrate to force the charges in the charge accumulation region to be discharged into the semiconductor substrate (=vertical overflow drain VOFD), or a VSUB signal; and FIG. 1D shows a driving voltage signal for driving the vertical transfer channel (vertical CCD, also referred to as the VCCD), or a VCCD signal.

With the method shown in FIGS. 1A to 1D, in response to an image pickup instruction (not shown), the semiconductor substrate starts to be driven by the VSUB signal and the vertical transfer channel (VCCD) starts to be driven at high speed by the VCCD signal. Because the VSUB signal is used to discharge the charges from the accumulation region, only the final output pulse related to the exposure timing is effective. To discharge the charges sufficiently and stabilize the potential in the element, H-rate driving is effected so as to output a short-time pulse with a specific width in each horizontal blanking period. In FIG. 1C, time t4 when the final VSUB pulse represented by a bold line was outputted corresponds to the exposure start time.

On the vertical transfer channel, continuous high-speed driving is done to discharge the unnecessary charges in the transfer channel, staring at a suitable time before the exposure start. Differently from the normal driving mode in which the individual pixel signals are read separately (in this mode, a vertical driving pulse corresponding to one unit=one horizontal pixel in each horizontal blanking interval), the vertical transfer channel is driven continuously at a speed several times or tens of times as fast as that of the normal driving. Consequently, the unnecessary charges, including smears, occurring as a result of the light rays continuing to strike the image pickup surface are discharged at high speed. The high-speed driving is continued until immediately before time t5, which is the timing of a subsequent exposure end. If a driving multiple (defined as the reciprocal ratio of the time required to transfer one screen) in high-speed driving with respect to normal driving is X, the high-speed driving period requires a minimum of 1/X of one frame period.

When a TG pulse is outputted at time t5, the accumulated optical charges are transferred to the shaded vertical transfer channel. At time t5, the exposure is completed. Then, the mechanical shutter is closed immediately to prevent smears. Since a delay time dt of about several hundreds of microseconds to several milliseconds is required for the mechanical shutter to close, the reading of signals in normal driving by the VCCD signal is not started in the period dt. At the time when the mechanical shutter is closed, actually at time t6 including a margin taking into account variations in the operation of the mechanical shutter, the reading of image signals in normal driving is started. Then, the mechanical shutter is kept closed until the read period for one frame in which the transfer of at least one frame of image signals is completed has elapsed.

As described above, when the signal is read, no smear takes place because no light ray strikes the image pickup element. In addition, since the charge accumulation time is completely controlled electrically, the high-speed shutter almost impossible to realize mechanically can be realized without being affected by variations in the mechanical shutter. An example of such techniques has been disclosed in, for example, Jpn. Pat. Appln. KOKAI Publication No. 10-191170.

The aforementioned conventional exposure control has the following problem: a smear caused by the light rays projected immediately before at least the exposure period Ts ends, or immediately before a TG pulse is outputted, cannot be discharged completely even by high-speed discharging. When it is assumed that the vertical transfer channel is driven at high speed X times as fast as that of normal driving as described above, a time of 1 Tfr/X is required to transfer a screen of charges, where Tfr is one frame period. As a result, smears occurred at one end of the screen (or smears occurred in the center of the screen in the half of one frame period) immediately before a TG pulse is generated cannot be discharged completely and remain in the transfer channel, with the result that they become tangible as vertically striped white smears.

This problem becomes more significant as much more pixels are used in the image pickup element. The reason is that use of an enormous number of pixels tends to make the transfer time (frame rate) of the transfer channel longer, which lengthens the required discharging time 1 Tfr/X in high-speed transfer accordingly.

BRIEF SUMMARY OF THE INVENTION

The object of the present invention is to provide a high-picture-quality image pickup device which not only realizes a superhigh-speed shutter but also prevents white-striped smears from occurring in any case.

According to one aspect of the invention, there is provided a device for photographing an image of a subject, comprising:

a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode;

optical shutter means which is capable of switching between an opening mode that permits light rays to impinge on the imaging surface of the imaging device and a closing mode that inhibits light rays from impinging on the imaging surface, the optical shutter having a delay in switching from the closing mode to the opening mode or from the opening mode to the closing mode; and exposure control means for controlling the amount of light rays that reaches the imaging surface by controlling the driving means and shutter means, wherein the exposure control means switches the shutter means to the closing mode at a first time in response to the start in photographing the image of the subject, causes the driving means to start to supply the charge discharging signal to the imaging device at the first time, thereby discharging the accumulated charges from the accumulating section to the outside of the imagining device in the charge discharge mode, causes the driving means to start to supply a high transfer rate driving signal to the imaging device at the first time, thereby driving the charge transfer section at high transfer rate for a specific period, the charges being transferred in the charge transfer section to the outside of the imaging device via the output section in the charge discharge mode, causes the driving means to stop supplying the high transfer rate driving signal to the imaging device at a second time, thereby stopping the driving of the charge transfer section, switches the shutter means from the closing mode to the opening mode after the second time and keeps the shutter means in the opening mode after a third time, causes the driving means to stop supplying the charge discharging signal to the imaging device at a time substantially equal to or before the third time and the charge accumulating section to start to accumulate charges, switches the shutter means to the closing mode at a fourth time within a exposure period from the third time, and causes the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device.

According to a second aspect of the invention, there is provided a device for photographing an image of a subject, comprising:

a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode;

optical shutter means which is capable of switching between an opening mode that permits light rays to impinge on the imaging surface of the imaging device and a closing mode that inhibits light rays from impinging on the imaging surface, the optical shutter having a delay in switching from the closing mode to the opening mode or from the opening mode to the closing mode; and exposure control means which controls the amount of light rays that reaches the imaging surface by controlling the driving means and shutter means and includes means for determining an exposure time and means for comparing the determined exposure time with a reference exposure time and setting one of a first and a second photographic mode, wherein, in the first photographic mode, the exposure control means switches the shutter means to the closing mode at a first time in response to the start in photographing the image of the subject, causes the driving means to start to supply the charge discharging signal to the imaging device at the first time, thereby discharging the accumulated charges from the accumulating section to the outside of the imagining device in the charge discharge mode, causes the driving means to start to supply a high transfer rate driving signal to the imaging device at the first time, thereby driving the charge transfer section at high transfer rate for a first specific period, the charges being transferred in the charge transfer section to the outside of the imaging device via the output section in the charge discharge mode, causes the driving means to stop supplying the high transfer rate driving signal to the imaging device at a second time, thereby stopping the driving of the charge transfer section, switches the shutter means from the closing mode to the opening mode after the second time and keeps the shutter means in the opening mode after a third time, causes the driving means to stop supplying the charge discharging signal to the imaging device at a time substantially equal to or before the third time and the charge accumulating section to start to accumulate charges, switches the shutter means to the closing mode at a fourth time within the exposure time from the third time, and causes the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device;

in the second photographic mode, the exposure control means switches the shutter means to the closing mode at the first time in response to the start in photographing the image of the subject, causes the driving means to start to supply a charge discharging signal to the imaging device at the first time, thereby discharging the accumulated charges from the charge accumulating section to the outside of the imaging device, causes the driving means to start to supply a high transfer rate driving signal to the imaging device at the first time, thereby driving the charge transfer section at high transfer rate for a second specific period, which transfers the charges in the charge transfer section outside the imaging device, causes the driving means to stop supplying the high transfer rate driving signal to the imaging device at the second time, thereby stopping the driving of the charge transfer section, switches the shutter means from the closing mode to the opening mode after the second time and keeps the shutter means in the opening mode at the third time, causes the driving means to stop supplying the charge discharging signal to the imaging device at the third time and the charge accumulating section to start to accumulate charges, switches the shutter means to the closing mode at the fourth time that the exposure time has elapsed since the third time, the exposure time ending before the delay dt in the optical shutter means has elapsed since the fourth time, and causes the driving means to supply a high transfer rate driving signal to the imaging device at the sixth time that the delay dt in the optical shutter means has elapsed since the fourth time, thereby driving the charge transfer section at high transfer rate for a third specific period and discharging the charges in the charge transfer section to the outside of the imaging device, and at the fifth time that the specific period of the high transfer rate driving has elapsed, causes the driving means to supply a normal driving signal to the imaging device, thereby driving the charge transfer section in the normal mode, which causes the charge transfer section to output an image signal outside the imaging device.

According to a third aspect of the invention, there is provided a method of controlling the amount of light rays that reaches an imaging surface by controlling driving means and shutter means in an image pickup device including a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode; and optical shutter means which is capable of switching between an opening mode that permits light rays to impinge on the imaging surface of the imaging device and a closing mode that inhibits light rays from impinging on the imaging surface, the optical shutter having a delay in switching from the closing mode to the opening mode or from the opening mode to the closing mode, the method comprising the steps of:

switching the shutter means to the closing mode at a first time in response to the start in photographing the image of the subject, causing the driving means to start to supply a charge discharging signal to the imaging device at the first time, thereby discharging the accumulated charged from the charge accumulating section to the outside of the imaging device, causing the driving means to start to supply a high transfer rate driving signal to the imaging device at the first time, thereby driving the charge transfer section at high transfer rate for a specific period or longer, which transfers the charges in the charge transfer section outside the imaging device, causing the driving means to stop supplying the high transfer rate driving signal to the imaging device at a second time, thereby stopping the driving of the charge transfer section, switching the shutter means from the closing mode to the opening mode after the second time and keeping the shutter means in the opening mode at a third time, causing the driving means to stop supplying the charge discharging signal to the imaging device at a time substantially equal to or before the third time and the charge accumulating section to start to accumulate charges, switching the shutter means to the closing mode at a fourth time within a exposure time from the third time, and causing the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device.

According to a fourth aspect of the invention, there is provided a method of controlling the amount of light that reaches an imaging surface by controlling driving means and shutter means in an image pickup device including a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode; and optical shutter means which is capable of switching between an opening mode that permits light rays to impinge on the imaging surface of the imaging device and a closing mode that inhibits light rays from impinging on the imaging surface, the optical shutter [1] having a delay in switching from the closing mode to the opening mode or from the opening mode to the closing mode, the method comprising the steps of determining an exposure time;

comparing the determined exposure time with a reference exposure time and setting one of a first and a second photographic mode;

in the first photographic mode, switching the shutter means to the closing mode at a first time in response to the start in photographing the image of the subject, causing the driving means to start to supply a charge discharging signal to the imaging device at the first time, thereby discharging the accumulated charged from the charge accumulating section to the outside of the imaging device, causing the driving means to start to supply a high transfer rate driving signal to the imaging device at the first time, thereby driving the charge transfer section at high transfer rate for a specific period or longer, which transfers the charges in the charge transfer section outside the imaging device, causing the driving means to stop supplying the high transfer rate driving signal to the imaging device at a second time, thereby stopping the driving of the charge transfer section, switching the shutter means from the closing mode to the opening mode after the second time and keeping the shutter means in the opening mode at a third time, causing the driving means to stop supplying the charge discharging signal to the imaging device at a time substantially equal to or before the third time and the charge accumulating section to start to accumulate charges, switching the shutter means to the closing mode at a fourth time within a exposure time from the third time, and causing the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device; and in the second photographic mode, switching the shutter means to the closing mode at the first time in response to the start in photographing the image of the subject;

causing the driving means to start to supply a charge discharging signal to the imaging device at the first time, thereby discharging the accumulated charges from the charge accumulating section to the outside of the imaging device;

causing the driving means to start to supply a high transfer rate driving signal to the imaging device at the first time, thereby driving the charge transfer section at high transfer rate for a specific period or longer, which transfers the charges in the charge transfer section outside the imaging device;

causing the driving means to stop supplying the high transfer rate driving signal to the imaging device at the second time, thereby stopping the driving of the charge transfer section;

switching the shutter means from the closing mode to the opening mode after the second time and keeping the shutter means in the opening mode at the third time;

causing the driving means to stop supplying the charge discharging signal to the imaging device at a time substantially equal to or before the third time and the charge accumulating section to start to accumulate charges;

switching the shutter means to the closing mode at the fourth time that the exposure period has elapsed since the third time, the exposure period ending before the delay dt in the optical shutter means has elapsed since the fourth time; and causing the driving means to supply a high transfer rate driving signal to the solid-state image pickup device at the sixth time that the delay dt in the optical shutter means has elapsed since the fourth time, thereby driving the charge transfer section at high transfer rate for a specific period or longer and discharging the charges in the charge transfer section to the outside of the imaging device, and at the fifth time that the specific period of the high transfer rate driving has elapsed, causing the driving means to supply a normal driving signal to the imaging device, thereby driving the charge transfer section normally, which causes the charge transfer section to output an image signal outside the imaging device.

According to a fifth aspect of the invention, there is provided a device for photographing an image of a subject, comprising:

a solid-state imaging device including a charge accumulating section on which the image is projected, for converting the image into charges and accumulating the charges, a charge transfer section for receiving the accumulated charges from the charge accumulating section and transferring them, and a output section for outputting the transferred charges as an image signal;

driving means for driving the charge accumulating section to accumulate the charges, the charge transfer section to transfer the charges from the charge accumulating section to the output section via the transfer section at a normal transfer rate, and the outputting section to output the image signal in a normal driving mode;

optical shutter means which is capable of switching between an opening mode for permitting the image to project the image on the accumulating section and a closing mode for inhibiting the image from being projected on the accumulating section, the optical shutter means having a delay in switching from the closing mode to the opening mode or from the opening mode to the closing mode; and exposure control means for controlling the driving means and the shutter means, wherein the exposure control means switches the shutter means to the closing mode, causes the driving means to start to discharge the charges from the accumulating section to the outside the imaging device, causes the driving means to drive the charge transfer section at a high transfer rate during a predetermined period, which transfers the charges in the charge transfer section to the outside the imaging device, causes the driving means to stop the transfer of the charges in the charge transfer section, switches the shutter means from the closing mode to the opening mode, causes the driving means to stop the discharge of the charges from the accumulating section, causes the driving means to the accumulating section to start to accumulate charges during a predetermined exposure period, switches the shutter means to the closing mode, and causes the driving means to drive the charge transfer section in the normal mode, and to output an image signal from the output section.

According to a sixth aspect of the invention, there is provided a device for photographing an image of a subject, comprising:

a solid-state imaging device including a charge accumulating section on which the image is projected, for converting the image into charges and accumulating the charges, a charge transfer section for receiving the accumulated charges from the charge accumulating section and transferring them, and a output section for outputting the transferred charges as an image signal;

driving means for driving the charge accumulating section to accumulate the charges, the charge transfer section to transfer the charges from the charge accumulating section to the output section via the transfer section at a normal transfer rate, and the outputting section to output the image signal in a normal driving mode;

optical shutter means which is capable of switching between an opening mode for permitting the image to project the image on the accumulating section and a closing mode for inhibiting the image from being projected on the accumulating section, the optical shutter means having a delay in switching from the closing mode to the opening mode or from the opening mode to the closing mode; and exposure control means for controlling the driving means and the shutter means and including means for determining an exposure time and means for comparing the determined exposure time with a reference exposure time and setting one of a first and a second photographic mode, wherein, in the first photographic mode, the exposure control means switches the shutter means to the closing mode, causes the driving means to start to discharge the charges from the accumulating section to the outside the imaging device, causes the driving means to drive the charge transfer section at a high transfer rate during a predetermined period, which transfers the charges in the charge transfer section to the outside the imaging device, causes the driving means to stop the transfer of the charges in the charge transfer section, switches the shutter means from the closing mode to the opening mode, causes the driving means to stop the discharge of the charges from the accumulating section, causes the driving means to the accumulating section to
start to accumulate charges during a predetermined
exposure period,
switches the shutter means to the closing mode, and
causes the driving means to drive the charge transfer
section in the normal mode, and to output an image
signal from the output section, and
in the second photographic mode,
the exposure control means switches the shutter means to
the closing mode,
causes the driving means to start to discharge the charges
from the accumulating section to the outside the imaging device,
causes the driving means to drive the charge transfer
section at a high transfer rate during a predetermined
period, which transfers the charges in the charge transfer section to the outside the imaging device,
causes the driving means to stop the transfer of the
charges in the charge transfer section,
switches the shutter means from the closing mode to the
opening mode,
causes the driving means to stop the discharge of the
charges from the accumulating section,
causes the driving means to the accumulating section to
start to accumulate charges during a predetermined
exposure period,
switches the shutter means to the closing mode,
causes the driving means to drive the charge transfer
section in the normal mode, and to output an image
signal from the output section,
causes the driving means to drive the charge transfer
section a high transfer rate during a predetermined
transfer period after the shutter means is switched in the
closing mode, and
causing the driving means to drive the accumulating
section and the charge transfer section after the predetermined transfer period in the normal transfer mode.

According to a seventh aspect of the invention, there is
provided a method of controlling a device for photographing
an image of a subject, the device comprising:
a solid-state imaging device including a charge accumulating section on which the image is projected, for
converting the image into charges and accumulating the
charges, a charge transfer section for receiving the
accumulated charges from the charge accumulating
section and transferring them, and a output section for
outputting the transferred charges as an image signal;
driving means for driving the charge accumulating section
to accumulate the charges, the charge transfer section to
transfer the charges from the charge accumulating
section to the output section via the transfer section at
a normal transfer rate, and the outputting section to
output the image signal in a normal driving mode; and
optical shutter means which is capable of switching
between an opening mode for permitting the image to
project the image on the accumulating section and a
closing mode for inhibiting the image from being
projected on the accumulating section, the optical shutter means having a delay in switching from the closing
mode to the opening mode or from the opening mode
to the closing mode;
the method comprising steps of
switching the shutter means to the closing mode,
causing the driving means to start to discharge the charges
from the accumulating section to the outside the imaging device,
causing the driving means to drive the charge transfer
section at a high transfer rate during a predetermined
period, which transfers the charges in the charge transfer section to the outside the imaging device,
causing the driving means to stop the transfer of the
charges in the charge transfer section, switching the
shutter means from the closing mode to the opening
mode,
causing the driving means to stop the discharge of the
charges from the accumulating section,
causing the driving means to the accumulating section to
start to accumulate charges during a predetermined
exposure period,
switching the shutter means to the closing mode, and
causing the driving means to drive the charge transfer
section in the normal mode, and to output an image
signal from the output section.

According to a eighth aspect of the invention, there is
provided a method of controlling a device for photographing
an image of a subject, the device comprising:
a solid-state imaging device including a charge accumulating section on which the image is projected, for
converting the image into charges and accumulating the
charges, a charge transfer section for receiving the
accumulated charges from the charge accumulating
section and transferring them, and a output section for
outputting the transferred charges as an image signal;
driving means for driving the charge accumulating section
to accumulate the charges, the charge transfer section to
transfer the charges from the charge accumulating
section to the output section via the transfer section at
a normal transfer rate, and the outputting section to
output the image signal in a normal driving mode; and
optical shutter means which is capable of switching
between an opening mode for permitting the image to
project the image on the accumulating section and a
closing mode for inhibiting the image from being
projected on the accumulating section, the optical shutter means having a delay in switching from the closing
mode to the opening mode or from the opening mode
to the closing mode;
the method comprising steps of
comparing the determined exposure time with a reference
exposure time; and
setting one of a first and a second photographic mode,
wherein, in the first photographic mode,
switching the shutter means to the closing mode,
causing the driving means to start to discharge the charges
from the accumulating section to the outside the imaging device,
causing the driving means to drive the charge transfer
section at a high transfer rate during a predetermined
period, which transfers the charges in the charge transfer section to the outside the imaging device,
causing the driving means to stop the transfer of the
charges in the charge transfer section,
switching the shutter means from the closing mode to the
opening mode,
causing the driving means to stop the discharge of the
charges from the accumulating section,
causing the driving means to the accumulating section to
start to accumulate charges during a predetermined
exposure period,
switching the shutter means to the closing mode, and causing the driving means to drive the charge transfer section in the normal mode, and to output an image signal from the output section;

in the second photographing mode, switching the shutter means to the closing mode, causing the driving means to start to discharge the charges from the accumulating section to the outside the imaging device, causing the driving means to drive the charge transfer section at a high transfer rate during a predetermined period, which transfers the charges in the charge transfer section to the outside the imaging device, causing the driving means to stop the transfer of the charges in the charge transfer section, switching the shutter means from the closing mode to the opening mode, causing the driving means to stop the discharge of the charges from the accumulating section, causing the driving means to the accumulating section to start to accumulate charges during a predetermined exposure period, switching the shutter means to the closing mode, causing the driving means to drive the charge transfer section in the normal mode, and to output an image signal from the output section, causing the driving means to drive the charge transfer section a high transfer rate during a predetermined transfer period after the shutter means is switched in the closing mode, and causing the driving means to drive the accumulating section and the charge transfer section after the predetermined transfer period in the normal transfer mode.

It is desirable that, in exposure control in the second control mode, the exposure control means should keep the shutter means in the shielded state at least until reading has been completed after the end of exposure by the shutter means, and in this state, causes the driving means to drive the charge transfer section at high speed for a specific period or longer, then causes the driving means to output a charge transfer gate pulse TG, and thereafter, causes the driving means to drive the charge transfer section normally, thereby reading the image signal.

Furthermore, it is desirable that the start of exposure and control before that should be common to exposure control in both the first control mode and the second control mode.

In addition, it is desirable that switching between the first and second control modes should be done using an estimated exposure time for the exposure control as the exposure time in comparing the exposure time with a specific value.

With the present invention, at least in the case of the high-speed shutter, the mechanical shutter is opened, closed, and opened in that order. After the charges have been discharged in the first closing, the exposure is ended in the presence of a TG in such a manner that the charge transfer section is not driven during the period of exposure to light. In the case of the low-speed shutter which permits current in the charge transfer section to have an effect (and which is not required to have a high accuracy), exposure is ended with the mechanical shutter, and then, a TG is outputted after the charges have been discharged. Thus, since the vertical transfer channel is not driven as long as it is exposed to light, no white-striped smear will occur. Moreover, since the most suitable control mode is used according to the exposure time particularly in the exposure end control, a high-quality image is obtained over all the region ranging from the high-speed shutter to the low-speed shutter.

Furthermore, the exposure control means keeps the shutter means in the shaded state until reading-has been completed after the end of exposure by the shutter means in exposure control in the second control mode, and in this state, causes the driving means to drive the charge transfer section at high speed for a specific period or longer, then causes the driving means to output a charge transfer pulse TG, and thereafter, causes the driving means to drive the charge transfer section normally, thereby reading the image signal. This makes it possible to obtain a high-quality image with no unnecessary charge mixed with the image, when at least the second control mode is used.

In addition, the exposure control means makes the start of exposure and control before that common to exposure control in both the first control mode and the second control mode. This makes it possible to apply the invention to, for example, direct photometry.

Still furthermore, the switching between the first and second control mode on the basis of the comparison of the exposure time with a specific value is judged using an estimated exposure time related to the exposure control. This makes it easy to apply the invention and enables the mode to be determined before the start of exposure control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, image pickup devices according to embodiments of the present invention will be explained in detail.

First Embodiment

Figure 2:
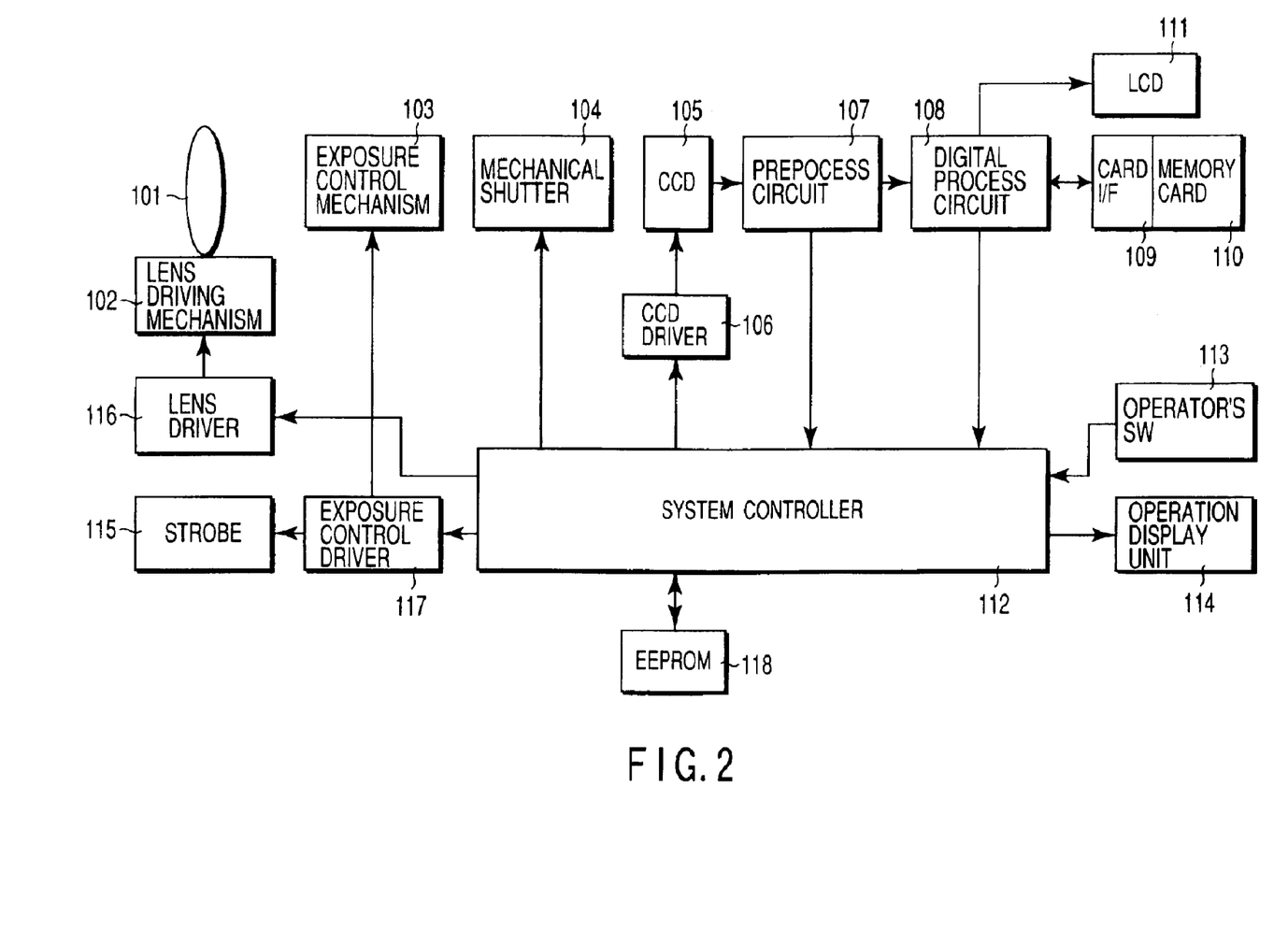
FIG. 2 is a block diagram of a digital camera according to a first embodiment of the present invention.

FIG. 2 is a block diagram of a digital camera according to a first embodiment of the present invention.

In FIG. 2, numeral 101 indicates a photographic lens system composed of lenses for directing the light rays from a subject into a camera. The lens system 101 is driven by a lens driving mechanism 102 in such a manner that the lens system is focused on the subject. An exposure control mechanism 103 for controlling exposure includes a stop and a driving mechanism for driving the stop and is provided to limit the amount of incident light passed through the lens system 101, thereby controlling the stop. The light rays passed through the exposure control mechanism 103 are directed via a mechanical shutter 104 to a CCD color image pickup element 105 with a color filter on the incident surface of the light rays. Thus, an image corresponding to the subject is formed on the CCD color image pickup element 105. The mechanical shutter 104 such as a guillotine shutter or a focal-plane shutter used in a conventional analog camera is typical one of optical shutters. There is another one of optical shutter such as a liquid-crystal shutter or PLZT ceramic shutter and so on.

The CCD color image pickup element 105 is driven by a CCD driver for generating a driving signal explained later. The CCD color image pickup element 105 generates image signals of various colors, including red, green, and blue image, according to the color filters. The R, G, and B pixel signals are inputted to a preprocess circuit 107 including an A/D converter. The preprocess circuit 107 outputs a digitized pixel signal. The pixel signal is inputted to a digital process circuit 108, which performs a color signal generating process, a matrix transformation process, and other various digital processes, thereby generating conversion color image data. The color image data is stored via a card interface 109 into a memory card 110, such as a CF (compact flash memory card) and is further displayed as a color image on an LCD image display unit 111.

The digital camera of FIG. 2 includes a system controller (CPU) 112 for supervising control of the individual sections of the camera. When operator's switches 113 made up of various SWs, including a release button, are operated, the system controller (CPU) 112 sets the operation mode according to the operation of the operator's switches 113 and displays the operating state and mode state on an operation display unit 114. The system controller (CPU) 112 also gives an instruction to drive the lenses, for example, a focus instruction, to a lens driver 116 in response to the operation of the operator's switches 113, for example, the release button. According to the driving signal from the lens driver 116, the lens driving mechanism 102 is controlled to move the lenses of the lens system 101, thereby realizing zooming or focusing. Furthermore, the digital camera includes a strobe light 115 as light-emitting means for projecting light on the subject. The strobe light 115 is controlled by an exposure control driver 117. The amount of light emitted from the strobe light is controlled by the exposure control driver 117, which determines the amount of emitted light so that light rays with the proper amount of light may be projected onto the subject. A nonvolatile memory (EEPROM) 118 for storing various pieces of setting information is connected to the system controller (CPU) 112. According to the various parameters stored in the nonvolatile memory (EEPROM) 118, the system controller (CPU) 112 calculates control signals for controlling various sections and supplies the control signals to the corresponding sections.

In the digital camera of FIG. 1, the system controller 112 supervises control of the individual sections as described above. Specifically, the system controller 112 controls the shutter unit included in the exposure control mechanism 103 and the driving of the CCD image pickup element 105 by a CCD driver 106 to perform exposure (charge accumulation) and read the signal, causes the digital process circuit 108 to take in the signal via the preprocess circuit 107, performs various signal processes, and then stores the resulting signal in the memory card 110 via the card interface 109. The CCD image pickup element 105 is the same as the conventional equivalent, for example, an interline-type CCD image pickup element with a vertical overflow drain structure.

Figure 3:
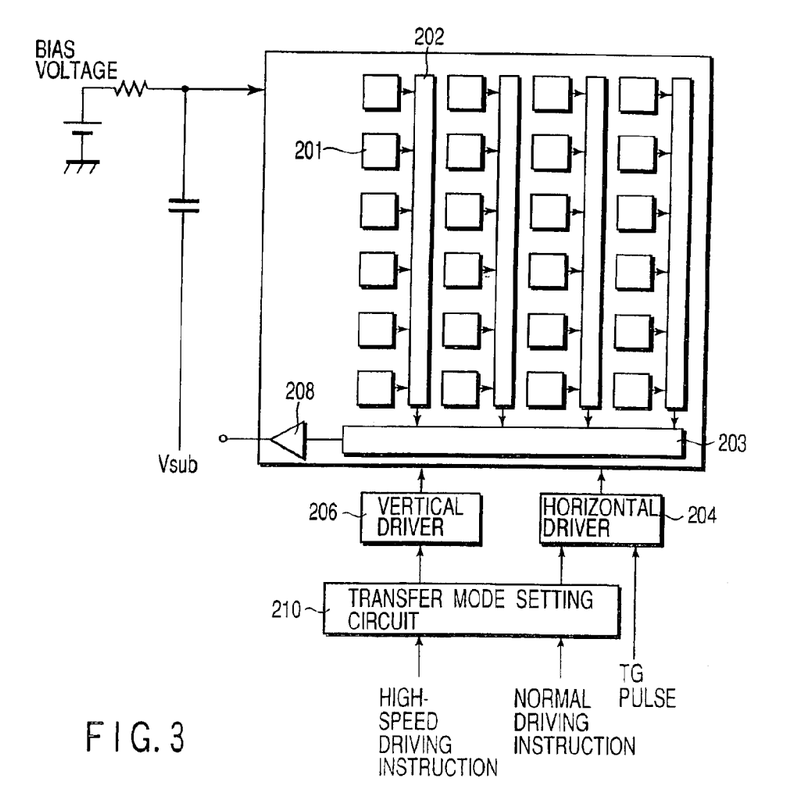
FIG. 3 is a block diagram of the CCD and CCD driver shown in FIG. 2.
Figure 4A:
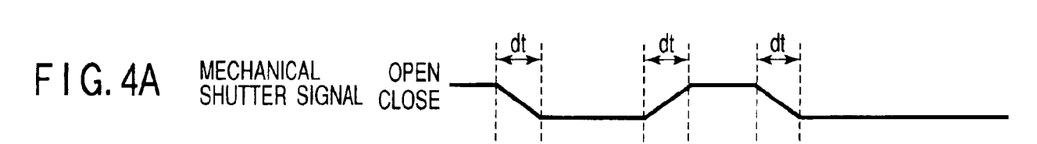
FIGS. 4A to 4D are timing charts showing the timing of each signal in exposure control in the digital camera of FIG. 2 according to the first embodiment.
Figure 4B:
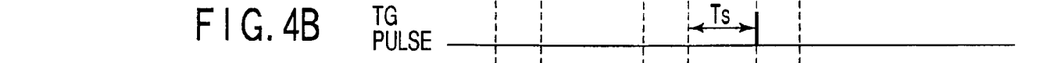
Figure 4C:
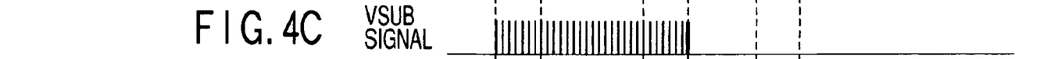
Figure 4D:
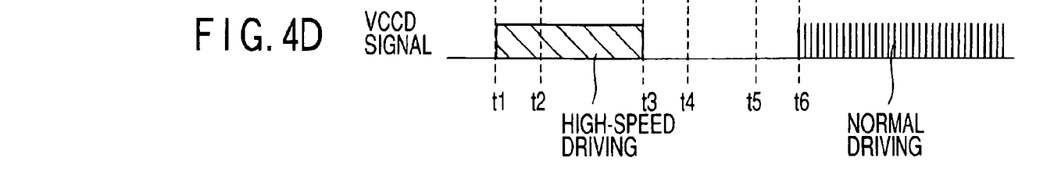

FIG. 3 is a block diagram of the CCD image pickup element 105 and the CCD driver 106 for driving the CCD image pickup element 105 of FIG. 2. In the CCD image pickup element 105, a large number of photodiodes 201 serving as pixels are formed on a semiconductor substrate in such a manner that they are arranged in a matrix, or in rows and columns. A CCD array (VCCD) that constitutes the vertical transfer channels 202 for transferring charges in the vertical direction along a column of photodiodes is formed on the semiconductor substrate. Another CCD array (HCCD) that constitutes a horizontal transfer channels 203 for transferring the charge signal on each line transferred from the vertical transfer channel 202 is formed on the semiconductor substrate along a column of photodiodes arrays. One end of the horizontal transfer channel 203 is further provided with an amplifier circuit 208 for amplifying the pixel signal outputted from the horizontal transfer channel 203, i.e., converting the chargers corresponding to the pixel signal to a voltage signal (charge-voltage conversion). The output pixel signal from the amplifier circuit 208 is outputted to the preprocess circuit 107 of FIG. 2. The CCD driver 106 includes a vertical driver 206 that generates a vertical CCD signal (VCCD signal) for transferring charges vertically on the vertical transfer channel (VCCD) 202 and a horizontal driver 204 that generates a horizontal CCD signal (HCCD signal) for transferring charges horizontally on a horizontal transfer channel (HCCD) 203. There is provided a transfer mode setting circuit 210 for determining the mode in which the vertical driver 206 and horizontal driver 204 are driven. When the system controller 112 inputs a high-speed driving instruction to the transfer mode setting circuit 210 on the basis of the image pickup start instruction from the system controller 112, the vertical driver 206 and horizontal driver 204 generates high speed drive signals under the control of the mode setting circuit 210 so that the charges remaining in the vertical transfer channel 202 and horizontal transfer channel 203 to be transferred one after another at high speed, which discharges the remaining charges outside the CCD image pickup element 105. When a Vsub signal for clearing charges generated at the photodiodes 201 is outputted and is applied to the semiconductor substrate along with a bias signal from a predetermined drive circuit (not shown) as the image pickup start instruction from the system controller 112, the charges in the photodiodes 201 are discharged outside the CCD image pickup element 105 via the substrate. When a TG pulse is inputted, a charge transfer voltage is applied to predetermined electrodes of the transfer electrodes in the vertical transfer channel 202, the predetermined electrodes functioning as the transfer gates so that charges accumulated in the photodiodes 201 and corresponding to the pixels are shifted to the vertical transfer channel 202 in such a manner that all the pixels are transferred in a same time. When the normal driving mode instruction is inputted to the transfer mode setting circuit 210 after the charges corresponding to the pixels are transferred to the vertical transfer channel in response to the TG signal, the vertical and horizontal drivers 204, 206 drive the vertical and horizontal transfer channels 202 and 203 in a normal driving condition, respectively. Thus, the pixels (charges) are sequentially transferred on the vertical and horizontal transfer channels 202, 203, respectively and outputted to the outside of the CCD image pickup element 105 from the amplifier circuit 204. In the finder display mode in which an image is displayed on the LCD 111, the system controller 112 gives a normal driving instruction to the transfer mode setting circuit 210. Then, the transfer mode setting circuit 210 is set in the normal driving mode. In this mode, an image is displayed on the LCD 111 on the basis of the image data outputted from the CCD image pickup element 105.

Next, referring to FIGS. 4A to 4D, an exposure control method according to an embodiment of the present invention will be explained in detail.

When the photographer operates the release button, for example, the photographer presses the release button halfway, after having operated the operator's switches 113 and set the photographic mode, the system controller gives an image pickup start instruction to the mechanical shutter 104, thereby actuating the mechanical shutter. That is, receiving the image pickup start instruction, the mechanical shutter 104 starts to open at time t1. Since the mechanical shutter 104 has mechanical delay of dt, the mechanical shutter is closed completely at time t2 that the delay dt has elapsed since time t1, which prevents light rays from entering the CCD image pick up element 105 completely. At time t1, the system controller gives an image pickup start instruction as a high-speed driving instruction to the CCD driver 106. In response to the image pickup start instruction, the transfer mode setting circuit of the CCD driver 106 of FIG. 3 is set in the high-speed driving mode. At time t1, the Vsub signal is supplied to the semiconductor substrate in every horizontal scanning period in response to the image pickup start instruction from the system controller 112, thereby discharging the charges remaining in the photodiodes 201 via the substrate outside the CCD image pickup element 105. When the high-speed driving instruction is inputted to the transfer mode setting circuit 210 at time t1 on the basis of the image pickup start instruction from the system controller 112, the transfer mode setting circuit 210 is set in the high-speed mode. In the high-speed driving mode, the vertical driver 206 and horizontal driver 204 are driven, thereby transferring the charges remaining on the vertical transfer channel 202 and horizontal transfer channel 203 at high speed, which discharges the remaining charges outside the CCD image pickup element 105.

In the period from time t1 that the mechanical shutter 104 starts to operate to time t2 and time t3 that the mechanical shutter 104 is closed completely, the charges remaining on the vertical transfer channel 202 and horizontal transfer channel 203 are discharged one after another. At time t3 after a predetermined period has elapsed since time t2, the mechanical shutter 104 starts to open. At time t3, the driving of the vertical driver 206 and horizontal driver 204 in the high-speed driving mode is stopped, preparing for the transfer of charges. At time t4 after the mechanical delay dt has elapsed since time t3, the mechanical shutter 104 is opened completely and at the same time, the application of the Vsub signal to the semiconductor substrate is stopped. Then, the photo charges start to be accumulated on the substrate on which the photodiodes 201 have been formed, the charges being generated and accumulated when light rays are incident on the photodiodes 201 arranged in a matrix start and converted into the charges. That is, the image formed on the CCD image pickup element 105 as a result of photography started at time t4 begins to be converted into an electric signal.

At time t5 after a period of Ts equivalent to the exposure time has elapsed since time t4, the TG pulse is generated and the accumulated charges corresponding to all the pixels are simultaneously shifted to the vertical transfer channel 202. At the same time, the mechanical shutter 104 starts to be closed. At time t6 after the mechanical delay dt has elapsed since time t5, the transfer mode setting circuit 210 is set in the normal driving mode. In the normal driving mode, the vertical driver 206 and horizontal driver 204 drive the corresponding transfer channels with a transfer pulse having the timing of the normal operation, the accumulated charges are sequentially transferred in the vertical transfer channel 202 and the horizontal transfer channel 203 and outputted from the CCD image pickup element 105 through the output amplifier 208. As explained earlier, the outputted image signal is supplied to the preprocess circuit 107 of FIG. 2, which processes the signal.

The exposure control system according to the present invention shown in FIGS. 4A to 4D differs from the conventional exposure control system explained by reference to FIGS. 1A to 1D. In addition, the VCCD signal which is one of typical driving signals is shown for indicating a driving conditions in the transfer channels. The exposure control system in FIGS. 4A to 4D differs from the conventional one in that the mechanical shutter has been closed at time t1 before actual exposure (corresponding to the period Ts). Actually, the mechanical shutter is closed completely only at time t2 because it has the operation delay time dt. In the meantime, the VSUB pulse is applied to the substrate at the H rate as described earlier, causing charges to be discharged from charge accumulation section. The driving of the VCCD causes charges to be discharged continuously from the vertical transfer channel at high speed. Particularly in the shaded state, the transfer channels are driven at high speed during the interval from time t2 to t3. This has only to be done for longer than one screen read period 1 Tfr/x shortened by the high-speed driving multiple X (t3−t2≧1 Tfr/X). Because the unnecessary charges on the vertical transfer channel have been discharged by high-speed driving in the period under the high transfer efficiency is achieved, no unnecessary charge is left on the transfer channel at time t3.

Then, at the same time that the driving by the VCCD signal is stopped at t3, the mechanical shutter is opened. Although the delay in the operation of the shutter in its opening is not necessarily the same as that in its closing, they are considered to be the same for the sake of explanation, because the difference between them is not essential. From this time on, although smears might occur because light rays are projected again, the smears will never spread in stripes because the vertical transfer has been stopped. This is the point where the present invention differs most from the conventional system.

Thereafter, at time t4 after the shutter has been opened fully, the VSUB pulse is finally outputted, discharging the last charges in the charge accumulation region to be discharged, which starts exposure. From this time on, a TG pulse is outputted at time t5 when a specific exposure time has been reached, which transfers exposure charges to be transferred to the vertical transfer channel. As a result, the image signal charges for the exposure time Ts have been obtained on the vertical transfer channel. At the same time, the shutter is closed. As soon as time t6 has been reached at which the closing of the shutter is completed, the image signal is read using the VCCD normal driving. Thereafter, at a suitable time after one frame period has elapsed and the signal has been read, the shutter is opened again.

The photographic signal thus obtained is subjected to various signal processes and is recorded in the memory card 110 or displayed on the LCD image display system 111. At this time, as described above, since the vertical transfer channel (VCCD) has not been driven at all in the transmitting period of light rays including the exposure period, no white-striped smear appears on the image recorded or displayed, providing a high-quality image.

What is feared in this embodiment is that, since the stop period of the VCCD is longer than that in the prior art (the present embodiment has a stop period of (t6–t3), whereas the conventional one has a stop period of (t6–t5≈dt)), the effect of dark current noise (fixed pattern noise) developed on the vertical transfer channel is a little great. Taking into account that the delay dt is normally one millisecond to several milliseconds, the stop period of VCCD≈2 dt in the embodiment is about twice as large as the stop period≈dt in the prior art in the case of the ultrahigh-speed shutter achieved by the present invention, that is, in the region where Ts is on the order of 100 microseconds or less. When a relatively high-speed shutter region with an exposure period of Ts=dt to 2 dt is considered, the stop period of the VCCD ranges from 3 dt to 4 dt, which does not become a problem, although there is an increase in the dark current noise.

In contrast, when the exposure time is long, there is a possibility of the effect of dark current noise becoming serious. This problem can be solved by changing the control mode according to the estimated exposure time, taking into account the fact that, when the exposure time is long, the accuracy of the mechanical shutter is relatively high. Such an example will be explained below as a second embodiment of the present invention.

Second Embodiment

FIGS. 5A to 5D are timing charts showing the timing for exposure control in a digital camera according to a second embodiment of the present invention.

A camera according to the second embodiment has almost the same configuration as that of the camera of the first embodiment and can realize both of a first and a second exposure control mode. In the first exposure control mode, the camera of the second embodiment performs control shown in FIGS. 4A to 4D as the camera of the first embodiment does. In the second exposure control mode, the camera of the second embodiment performs control shown in FIGS. 5A to 5D. In the second embodiment, the two modes are selectively carried out, depending on the value of the estimated exposure time. Control in the second mode shown in FIGS. 5A to 5D will be explained below.

Control performed during the time from when an image pickup instruction is received until exposure is started at time t4 is the same as in the first mode. Thus, its explanation will be omitted.

Figure 5A:
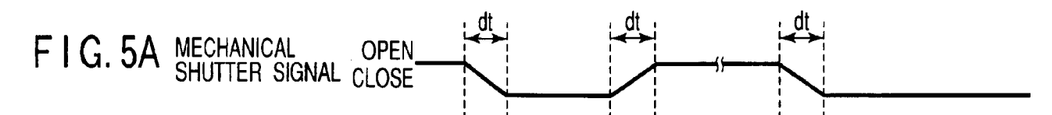
FIGS. 5A to 5D are timing charts showing the timing for exposure control in a digital camera according to a second embodiment of the present invention.
Figure 5B:
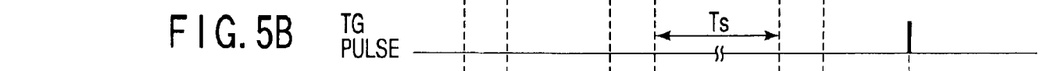
Figure 5C:
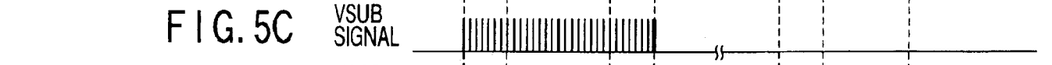
Figure 5D:
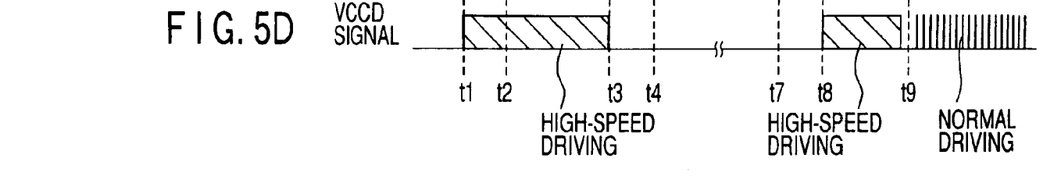

At time t7 when a specific exposure time has been reached, the shutter starts to close. This means that the image signal charges for the exposure time Ts have been obtained in the charge accumulation region. When the operating time of the mechanical shutter, or an operation delay of dt, is considered, the effective exposure ends between time t7 and time t8 when the closing operation is completed as shown in FIG. 5B. It goes without saying that time t7 when the shutter is closed is determined, taking the operation delay dt into account.

Then, after time t8 that the closing of the shutter ends has been reached, high-speed driving of the VCCD discharges the charges from the vertical transfer channel 202. This has only to be done for one screen read period 1 Tfr/X or more shortened by the high-speed driving multiple X. In this embodiment, however, the high-speed driving period is set at 1 Tfr/X to read the accumulated charges as fast as possible. Because the unnecessary charges already present on the vertical transfer channel 202 are discharged by high-speed driving during the period (1 Tfr/X), the unnecessary charges do not exist on such a transfer channel as the vertical transfer channel 202 at time t9. Consequently, dark current noise (fixed pattern noise) inherent to the vertical transfer channel, which might occur in the first embodiment, has no effect at all.

Thereafter, at time T9, a TG pulse is outputted immediately and the image signal charges in the accumulation region are transferred to the vertical transfer channel. Then, in normal driving of the VCCD, the image signal charges are read promptly. Thereafter, when the signal has been read after the elapse of one frame period, the shutter is opened at a suitable time.

In the second exposure control mode, too, since the transfer channel has not been driven by the VCCD signal during the period that light rays are projected, including the exposure time, no white-striped smear occurs on the image. As described above, there is no effect of dark current noise appearing on the vertical transfer channel. Because the end of exposure is determined by the mechanical shutter, there is a possibility that the accuracy of the exposure time will deteriorate in a high-speed shutter region exceeding heavily such a region where the exposure time is equal to the delay time dt.

The camera of the second embodiment uses the first mode and the second mode complementarily. Specifically, a switching exposure time, or a reference exposure time of TC is set. The mode is switched between the first mode and second mode, depending on the estimated exposure time Ts as follow:

When TS<TC, the mode is switched to the first mode.
When Ts≧TC, the mode is switched to the second mode.

Although the reference exposure time TC is set arbitrarily, a reference exposure time TC of about dt/2 to 2 dt is a suitable example to overcome the fear of noise in the first mode and the fear of exposure accuracy in the second embodiment in a compromising manner. In an example when TC equal to dt (TC=dt), in accordance with the embodiment, the reference exposure time TC is determined using the value of the mechanical delay dt. If the mechanical delay dt in the camera of the embodiment is about 1.4 ms, switching is done between the two modes using the reference exposure time 1.4 ms, or about 1/700 second.

In this case, since the first mode is set for a high-speed shutter with an exposure time shorter than the reference exposure time 1.4 ms, the exposure time is determined in a completely electronic manner, or arithmetically, and has a high accuracy. Dark current noise on the transfer channel, which might occur, becomes no problem, because the VCCD stop time is 4.2 ms or less at most. Then, since the second mode is used for a low-speed (long-time) shutter with an exposure time equal to or longer than 1.4 ms, dark current noise occurring on the transfer channel has no effect. The exposure time accuracy, which might deteriorate, becomes no problem, because the exposure time is longer than about the operating time of the shutter.

In another example of TC=t/2, if the reference exposure time is 0.7 ms, the mode will be switched between the two mode using the reference exposure time 0.7 ms as a reference.

In still another example of TC=2 t, if the reference exposure time is 2.8 ms, the mode will be switched between the two mode using the reference exposure time 2.8 ms as a reference.

If the mechanical delay time dt of the shutter is about 5 ms in the still another example of TC=2 t, the reference exposure time is 10 ms.

Empirically, the reference exposure time is set in the range from 0.7 ms to 10 ms.

The image pickup image obtained this way is subjected to various signal processes suitably. The resulting signal is recorded in the memory card 110 or displayed on the LCD image display system 111. The image recorded or displayed is free from white-striped smears and has a high picture equality.

(Modification)

Other various embodiments can be considered.

Although in the second mode in the second embodiment, the processes as far as the start of exposure are made the same as those in the first mode to make control common, this is not essential. Specifically, since in the second mode, the unnecessary charges on the transfer channel are discharged in high-speed driving of the VCCD after the exposure started at time t8, even if smears occurred on the transfer channel before that, they would not get mixed with the image signal finally read. Thus, control until the start of exposure may be performed as in the conventional example in FIGS. 1A to 1D.

While in the processes as far as the start of exposure in the second mode in the second embodiment, exposure has been started at the output of the final VSUB pulse, exposure may be started by the opening of the mechanical shutter as long as the accuracy is acceptable, because the mechanical shutter is used in the second mode in such a region where the exposure time accuracy is secured. That is, for example, in control shown in FIGS. 5A to 5D, the mechanical shutter may be opened after the final VSUB pulse has been outputted at time t4.

On the other hand, while in the second embodiment, the control mode has been changed, depending on the value of the estimated exposure time, this is the simplest example of applying the present invention to the most widely used control whereby actual exposure is made using the estimated exposure time determined immediately before exposure, and is not restrictive. Actually, since control until the start of exposure is common in the second embodiment, regardless of the mode as described above, the selection of the mode has only to be determined until immediately before the exposure is completed. Thus, for example, another modification is that the mode is set to the first mode at first, regardless of the estimated exposure time, and at the time when the elapsed time from the start of the exposure has reached the TC, the mode is switched to the second mode. In this modification, the present invention can be applied easily to a case where, for example, the exposure is measured in real time during exposure and the exposure time is determined finally, or to what is called direct photometry (real-time exposure integral photometry).

While in the above embodiment, the mechanical shutter has been used as the shutter, any optical shutter, including an electrooptic element, such as PLZT ceramic or liquid crystal, may be used as long as it is capable of practically controlling the transmitting and shading of an optical image onto and from the image pickup element. Because a liquid-crystal shutter has the same problem of being unable to realize a high-speed operation (although the cause and phenomenon are quite different from what has been explained above), it may be a preferable modification of the second embodiment.

The present invention may be practiced or embodied in still other ways without departing from the spirit or essential character thereof.

As described above in detail, with the present invention, since the optical shutter is also used, while the start of exposure and the end of exposure are being controlled in a completely electronic manner by the final VSUB pulse and the TG pulse respectively, and the vertical transfer is stopped during the time when light is striking the image pickup surface, this produces an excellent effect of preventing white-striped smears from appearing while realizing a high-accuracy superhigh-speed shutter.

Furthermore, with the present invention, since switching is done between the first control mode in which at least the exposure is ended by a TG pulse in a completely electronic manner and the second control mode in which the exposure is ended optically by the closing of the shutter, depending on whether the exposure time is longer or shorter than a specific value, this produces an excellent effect of solving complementarily the problem of deterioration of the picture quality due to an electronic shutter liable to occur when the exposure time is long and the problem of deterioration of the accuracy of the shutter liable to occur when the exposure time is short.

In addition, high-speed driving is done on the vertical transfer channel in the shaded state before the transfer of the exposure charges in the second control mode, thereby discharging the unnecessary charges. This makes it possible to obtain a high-quality image completely free from the unnecessary charges mixed with the image. Moreover, control until the start of exposure is shared by the first and second modes, which makes it possible to select the mode immediately before the end of exposure. This can be applied to, for example, direct photometry.

Furthermore, the switching between the first and second mode is judged on the basis of the estimated exposure time, which produces an excellent effect of facilitating the switching and being able to determine the mode before the start of exposure control.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device for photographing an image of a subject, comprising:

a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode;

optical shutter means which is capable of switching between an opening mode that permits light rays to impinge on the imaging surface of the imaging device and a closing mode that inhibits light rays from impinging on the imaging surface, the optical shutter having a delay in switching from the closing mode to the opening mode or from the opening mode to the closing mode; and exposure control means for controlling the amount of light rays that reaches the imaging surface by controlling the driving means and shutter means, wherein the exposure control means switches the shutter means to the closing mode at a first time in response to the start in photographing the image of the subject, causes the driving means to start to supply the charge discharging signal to the imaging device at the first time, thereby discharging the accumulated charges from the accumulating section to the outside of the imaging device in the charge discharge mode, causes the driving means to start to supply a high transfer rate driving signal to the imaging device at the first time, thereby driving the charge transfer section at high transfer rate for a specific period, the charges being transferred in the charge transfer section to the outside of the imaging device via the output section in the charge discharge mode, causes the driving means to stop supplying the high transfer rate driving signal to the imaging device at a second time, thereby stopping the driving of the charge transfer section, switches the shutter means from the closing mode to the opening mode after the second time and keeps the shutter means in the opening mode after a third time, causes the driving means to stop supplying the charge discharging signal to the imaging device at a time substantially equal to or before the third time and the charge accumulating section to start to accumulate charges, switches the shutter means to the closing mode at a fourth time within a exposure period from the third time, and causes the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device.

2. The device according to claim 1, wherein the fourth time almost coincides with the exposure period from the third time, and the fifth time coincides with the time when a delay of dt in the optical shutter means has elapsed since the fourth time.

3. The device according to claim 1, wherein the fourth time is set before the exposure period has elapsed since the third time, the exposure period ending before the delay in the optical shutter means has elapsed since the fourth time.

4. The device according to claim 3, wherein the exposure control means causes the driving means to supply a high transfer rate driving signal to the imaging device at a sixth time that the delay in the optical shutter means has elapsed since the fourth time, thereby driving the charge transfer section at high transfer rate for a second specific period, which discharges the charges from the charge transfer section to the outside of the imaging device, and at the fifth time that the second specific period of the high transfer rate driving has elapsed, causes the driving means to supply a normal driving signal to the imaging device, thereby driving the charge transfer section in the normal driving mode, which causes the charge transfer section to output an image signal outside the imaging device.

5. A device for photographing an image of a subject, comprising:

a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode;

optical shutter means which is capable of switching between an opening mode that permits light rays to impinge on the imaging surface of the imaging device and a closing mode that inhibits light rays from impinging on the imaging surface, the optical shutter having a delay in switching from the closing mode to the opening mode or from the opening mode to the closing mode; and exposure control means which controls the amount of light rays that reaches the imaging surface by controlling the driving means and shutter means and includes means for determining an exposure time and means for comparing the determined exposure time with a reference exposure time and setting one of a first and a second photographic mode, wherein, in the first photographic mode, the exposure control means switches the shutter means to the closing mode at a first time in response to the start in photographing the image of the subject, causes the driving means to start to supply the charge discharging signal to the imaging device at the first time, thereby discharging the accumulated charges from the accumulating section to the outside of the imaging device in the charge discharge mode, causes the driving means to start to supply a high transfer rate driving signal to the imaging device at the first time, thereby driving the charge transfer section at high transfer rate for a first specific period, the charges being transferred in the charge transfer section to the outside of the imaging device via the output section in the charge discharge mode, causes the driving means to stop supplying the high transfer rate driving signal to the imaging device at a second time, thereby stopping the driving of the charge transfer section, switches the shutter means from the closing mode to the opening mode after the second time and keeps the shutter means in the opening mode after a third time, causes the driving means to stop supplying the charge discharging signal to the imaging device at a time substantially equal to or before the third time and the charge accumulating section to start to accumulate charges, switches the shutter means to the closing mode at a fourth time within the exposure time from the third time, and causes the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device;

in the second photographic mode, the exposure control means switches the shutter means to the closing mode at the first time in response to the start in photographing the image of the subject, causes the driving means to start to supply a charge discharging signal to the imaging device at the first time, thereby discharging the accumulated charges from the charge accumulating section to the outside of the imaging device, causes the driving means to start to supply a high transfer rate driving signal to the imaging device at the first time, thereby driving the charge transfer section at high transfer rate for a second specific period, which transfers the charges in the charge transfer section outside the imaging device, causes the driving means to stop supplying the high transfer rate driving signal to the imaging device at the second time, thereby stopping the driving of the charge transfer section, switches the shutter means from the closing mode to the opening mode after the second time and keeps the shutter means in the opening mode at the third time, causes the driving means to stop supplying the charge discharging signal to the imaging device at the third time and the charge accumulating section to start to accumulate charges, switches the shutter means to the closing mode at the fourth time that the exposure time has elapsed since the third time, the exposure time ending before the delay dt in the optical shutter means has elapsed since the fourth time, and causes the driving means to supply a high transfer rate driving signal to the imaging device at the sixth time that the delay dt in the optical shutter means has elapsed since the fourth time, thereby driving the charge transfer section at high transfer rate for a third specific period and discharging the charges in the charge transfer section to the outside of the imaging device, and at the fifth time that the specific period of the high transfer rate driving has elapsed, causes the driving means to supply a normal driving signal to the imaging device, thereby driving the charge transfer section in the normal mode, which causes the charge transfer section to output an image signal outside the imaging device.

6. The device according to claim 5, wherein the reference exposure time is set to TC=dt/2 to 2 dt, where dt means a delay in the optical shutter means.

7. The device according to claim 6, wherein the first photographic mode is set when the specific exposure time Ts fulfills the expression Ts<TC, whereas the second photographic mode is set when the specific exposure time Ts fulfills the expression Ts≧TC.

8. The device according to claim 5, wherein the reference exposure time is set at 1.4 ms.

9. The device according to claim 5, wherein the period from the first time to second time is set at 1 Tfr/X or more, during which period the driving means supplies the high transfer rate driving signal to the imaging device, thereby driving the charge transfer section at high transfer rate for the first specific period, which transfers the charges from the charge transfer section to the outside of the imaging device, where X means a multiple of the high transfer rate transfer rate with respect to the normal transfer rate and 1 Tfr means a read period for one screen.

10. A method of controlling the amount of light rays that reaches an imaging surface by controlling driving means and shutter means in an image pickup device including a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode; and optical shutter means which is capable of switching between an opening mode that permits light rays to impinge on the imaging surface of the imaging device and a closing mode that inhibits light rays from impinging on the imaging surface, the optical shutter having a delay in switching from the closing mode to the opening mode or from the opening mode to the closing mode, the method comprising the steps of:

switching the shutter means to the closing mode at a first time in response to the start in photographing the image of the subject, causing the driving means to start to supply a charge discharging signal to the imaging device at the first time, thereby discharging the accumulated charged from the charge accumulating section to the outside of the imaging device, causing the driving means to start to supply a high transfer rate driving signal to the imaging device at the first time, thereby driving the charge transfer section at high transfer rate for a specific period or longer, which transfers the charges in the charge transfer section outside the imaging device, causing the driving means to stop supplying the high transfer rate driving signal to the imaging device at a second time, thereby stopping the driving of the charge transfer section, switching the shutter means from the closing mode to the opening mode after the second time and keeping the shutter means in the opening mode at a third time, causing the driving means to stop supplying the charge discharging signal to the imaging device at a time substantially equal to or before the third time and the charge accumulating section to start to accumulate charges, switching the shutter means to the closing mode at a fourth time within a exposure time from the third time, and causing the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device.

11. The method according to claim 10, wherein the fourth time almost coincides with the exposure period from the third time, and the fifth time coincides with the time when a delay of dt in the optical shutter means has elapsed since the fourth time.

12. The method according to claim 10, wherein the fourth time is set before the exposure period has elapsed since the third time, the exposure period ending before the delay in the optical shutter means has elapsed since the fourth time.

13. The method according to claim 12, wherein the exposure control means causes the driving means to supply a high transfer rate driving signal to the imaging device at a sixth time that the delay in the optical shutter means has elapsed since the fourth time, thereby driving the charge transfer section at high transfer rate for a specific period, which discharges the charges from the charge transfer section to the outside of the imaging device, and at the fifth time that the specific period of the high transfer rate driving has elapsed, causes the driving means to supply a normal driving signal to the imaging device, thereby driving the charge transfer section normally, which causes the charge transfer section to output an image signal outside the imaging device.

14. A method of controlling the amount of light that reaches an imaging surface by controlling driving means and shutter means in an image pickup device including a solid-state imaging device which has an imaging surface composed of a large number of pixel elements struck by light rays from the subject, which includes a charge accumulating section for converting the incident light rays into charges by the pixel elements and accumulating the charges, a charge transfer section for receiving the charges from the charge accumulating section and transferring them, and a output section for outputting the transferred charges as an image signal;

driving means which generates a normal driving signal in a normal driving mode to drive the accumulating section and the transfer section for transferring the charges accumulated in the charge accumulating section to the charge transfer section at a normal transfer rate and causing the imaging device to output the image signal from the output section, and which further generates a charge discharging signal for discharging the charges from the charge accumulating section outside the imaging device and a high transfer rate driving signal for transferring the charges in the charge transfer section at a high transfer rate higher than the normal transfer rate in a charge discharge mode; and optical shutter means which is capable of switching between an opening mode that permits light rays to impinge on the imaging surface of the imaging device and a closing mode that inhibits light rays from impinging on the imaging surface, the optical shutter having a delay in switching from the closing mode to the opening mode or from the opening mode to the closing mode, the method comprising the steps of determining an exposure time;

comparing the determined exposure time with a reference exposure time and setting one of a first and a second photographic mode;

in the first photographic mode, switching the shutter means to the closing mode at a first time in response to the start in photographing the image of the subject, causing the driving means to start to supply a charge discharging signal to the imaging device at the first time, thereby discharging the accumulated charged from the charge accumulating section to the outside of the imaging device, causing the driving means to start to supply a high transfer rate driving signal to the imaging device at the first time, thereby driving the charge transfer section at high transfer rate for a specific period or longer, which transfers the charges in the charge transfer section outside the imaging device, causing the driving means to stop supplying the high transfer rate driving signal to the imaging device at a second time, thereby stopping the driving of the charge transfer section, switching the shutter means from the closing mode to the opening mode after the second time and keeping the shutter means in the opening mode at a third time, causing the driving means to stop supplying the charge discharging signal to the imaging device at a time substantially equal to or before the third time and the charge accumulating section to start to accumulate charges, switching the shutter means to the closing mode at a fourth time within a exposure time from the third time, and causing the driving means to supply a normal driving signal to the imaging device at a fifth time, until when the shutter means has been kept in the closing mode since the fourth time, thereby driving the charge transfer section in the normal driving mode, which causes the charge transfer section to output an image signal outside the imaging device; and in the second photographic mode, switching the shutter means to the closing mode at the first time in response to the start in photographing the image of the subject;

causing the driving means to start to supply a charge discharging signal to the imaging device at the first time, thereby discharging the accumulated charges from the charge accumulating section to the outside of the imaging device;

causing the driving means to start to supply a high transfer rate driving signal to the imaging device at the first time, thereby driving the charge transfer section at high transfer rate for a specific period or longer, which transfers the charges in the charge transfer section outside the imaging device;

causing the driving means to stop supplying the high transfer rate driving signal to the imaging device at the second time, thereby stopping the driving of the charge transfer section;

switching the shutter means from the closing mode to the opening mode after the second time and keeping the shutter means in the opening mode at the third time;

causing the driving means to stop supplying the charge discharging signal to the imaging device at a time substantially equal to or before the third time and the charge accumulating section to start to accumulate charges;

switching the shutter means to the closing mode at the fourth time that the exposure period has elapsed since the third time, the exposure period ending before the delay dt in the optical shutter means has elapsed since the fourth time; and causing the driving means to supply a high transfer rate driving signal to the solid-state image pickup device at the sixth time that the delay dt in the optical shutter means has elapsed since the fourth time, thereby driving the charge transfer section at high transfer rate for a specific period or longer and discharging the charges in the charge transfer section to the outside of the imaging device, and at the fifth time that the specific period of the high transfer rate driving has elapsed, causing the driving means to supply a normal driving signal to the imaging device, thereby driving the charge transfer section normally, which causes the charge transfer section to output an image signal outside the imaging device.

15. The method according to claim 14, wherein the reference exposure time is set to TC=dt/2 to 2 dt, where dt means a delay in the optical shutter means.

16. The method according to claim 14, wherein the first photographic mode is set when the specific exposure time Ts fulfills the expression Ts<TC, whereas the second photographic mode is set when the specific exposure time Ts fulfills the expression Ts≧TC.

17. The method according to claim 14, wherein the reference exposure time is set at 1.4 ms.

18. The method according to claim 14, wherein the period from the first time to second time is set at 1 Tfr/X or more, during which period the driving means supplies the high transfer rate driving signal to the imaging device, thereby driving the charge transfer section at high transfer rate for a specific period or longer, which transfers the charges from the charge transfer section outside the imaging device, where X means a multiple of the high transfer rate transfer rate with respect to the normal transfer rate and 1 Tfr means a read period for one screen.

19. A device for photographing an image of a subject, comprising:

a solid-state imaging device including a charge accumulating section on which the image is projected, for converting the image into charges and accumulating the charges, a charge transfer section for receiving the accumulated charges from the charge accumulating section and transferring them, and a output section for outputting the transferred charges as an image signal;

driving means for driving the charge accumulating section to accumulate the charges, the charge transfer section to transfer the charges from the charge accumulating section to the output section via the transfer section at a normal transfer rate, and the outputting section to output the image signal in a normal driving mode;

optical shutter means which is capable of switching between an opening mode for permitting the image to project the image on the accumulating section and a closing mode for inhibiting the image from being projected on the accumulating section, the optical shutter means having a delay in switching from the closing mode to the opening mode or from the opening mode to the closing mode; and exposure control means for controlling the driving means and the shutter means and including means for determining an exposure time and means for comparing the determined exposure time with a reference exposure time and setting one of a first and a second photographic mode, wherein, in the first photographic mode, the exposure control means switches the shutter means to the closing mode, causes the driving means to start to discharge the charges from the accumulating section to the outside the imaging device, causes the driving means to drive the charge transfer section at a high transfer rate during a predetermined period, which transfers the charges in the charge transfer section to the outside the imaging device, causes the driving means to stop the transfer of the charges in the charge transfer section, switches the shutter means from the closing mode to the opening mode, causes the driving means to stop the discharge of the charges from the accumulating section, causes the driving means to the accumulating section to start to accumulate charges during a predetermined exposure period, switches the shutter means to the closing mode, and causes the driving means to drive the charge transfer section in the normal mode, and to output an image signal from the output section, and in the second photographic mode, the exposure control means switches the shutter means to the closing mode, causes the driving means to start to discharge the charges from the accumulating section to the outside the imaging device, causes the driving means to drive the charge transfer section at a high transfer rate during a predetermined period, which transfers the charges in the charge transfer section to the outside the imaging device, causes the driving means to stop the transfer of the charges in the charge transfer section, switches the shutter means from the closing mode to the opening mode, causes the driving means to stop the discharge of the charges from the accumulating section, causes the driving means to the accumulating section to start to accumulate charges during a predetermined exposure period, switches the shutter means to the closing mode, causes the driving means to drive the charge transfer section in the normal mode, and to output an image signal from the output section, causes the driving means to drive the charge transfer section a high transfer rate during a predetermined transfer period after the shutter means is switched in the closing mode, and causing the driving means to drive the accumulating section and the charge transfer section after the predetermined transfer period in the normal transfer mode, wherein the reference exposure time is set to TC=dt/2 to 2 dt, where dt means a delay in the optical shutter means.

20. The device according to claim 19, wherein the first photographic mode is set when the specific exposure time Ts fulfills the expression Ts<TC, whereas the second photographic mode is set when the specific exposure time Ts fulfills the expression Ts≧TC.

21. The device according to claim 19, wherein the reference exposure time is set at 1.4 ms.

22. A method of controlling a device for photographing an image of a subject, the device comprising:

a solid-state imaging device including a charge accumulating section on which the image is projected, for converting the image into charges and accumulating the charges, a charge transfer section for receiving the accumulated charges from the charge accumulating section and transferring them, and a output section for outputting the transferred charges as an image signal;

driving means for driving the charge accumulating section to accumulate the charges, the charge transfer section to transfer the charges from the charge accumulating section to the output section via the transfer section at a normal transfer rate, and the outputting section to output the image signal in a normal driving mode; and optical shutter means which is capable of switching between an opening mode for permitting the image to project the image on the accumulating section and a closing mode for inhibiting the image from being projected on the accumulating section, the optical shutter means having a delay in switching from the closing mode to the opening mode or from the opening mode to the closing mode;

the method comprising steps of comparing the determined exposure time with a reference exposure time; and setting one of a first and a second photographic mode, wherein, in the first photographic mode, switching the shutter means to the closing mode, causing the driving means to start to discharge the charges from the accumulating section to the outside the imaging device, causing the driving means to drive the charge transfer section at a high transfer rate during a predetermined period, which transfers the charges in the charge transfer section to the outside the imaging device, causing the driving means to stop the transfer of the charges in the charge transfer section, switching the shutter means from the closing mode to the opening mode, causing the driving means to stop the discharge of the charges from the accumulating section, causing the driving means to the accumulating section to start to accumulate charges during a predetermined exposure period, switching the shutter means to the closing mode, and causing the driving means to drive the charge transfer section in the normal mode, and to output an image signal from the output section;

in the second photographing mode, switching the shutter means to the closing mode, causing the driving means to start to discharge the charges from the accumulating section to the outside the imaging device, causing the driving means to drive the charge transfer section at a high transfer rate during a predetermined period, which transfers the charges in the charge transfer section to the outside the imaging device, causing the driving means to stop the transfer of the charges in the charge transfer section, switching the shutter means from the closing mode to the opening mode, causing the driving means to stop the discharge of the charges from the accumulating section, causing the driving means to the accumulating section to start to accumulate charges during a predetermined exposure period, switching the shutter means to the closing mode, causing the driving means to drive the charge transfer section in the normal mode, and to output an image signal from the output section, causing the driving means to drive the charge transfer section a high transfer rate during a predetermined transfer period after the shutter means is switched in the closing mode, and causing the driving means to drive the accumulating section and the charge transfer section after the predetermined transfer period in the normal transfer mode, wherein the reference exposure time is set to TC dt/2 to 2 dt, where dt means a delay in the optical shutter means.

23. The method according to claim 22, wherein the first photographic mode is set when the specific exposure time Ts fulfills the expression Ts<TC, whereas the second photographic mode is set when the specific exposure time Ts fulfills the expression Ts≧TC.

24. The method according to claim 22, wherein the reference exposure time is set at 1.4 ms.

* * * * *